(12) United States Patent
Schaevitz et al.

(10) Patent No.: US 9,583,778 B2
(45) Date of Patent: Feb. 28, 2017

(54) CHEMICALLY SINTERED COMPOSITE ELECTRODES AND MANUFACTURING PROCESSES

(75) Inventors: Samuel B. Schaevitz, Fremont, CA (US); Zachary Byars, Cambridge, MA (US); Ramanan Ganeshananthan, Burlington, MA (US); Atul Verma, Westford, MA (US); Vladimir Petrovsky; John Rule, Carlisle, MA (US)

(73) Assignee: ROBERT BOSCH GMBH, Stuttgart (DE)

( * ) Notice: Subject to any disclaimer, the term of this patent is extended or adjusted under 35 U.S.C. 154(b) by 1387 days.

(21) Appl. No.: 11/888,943

(22) Filed: Aug. 3, 2007
(Under 37 CFR 1.47)

(65) Prior Publication Data
US 2009/0035633 A1 Feb. 5, 2009

(51) Int. Cl.
*H01M 8/1213* (2016.01)
*H01M 8/1286* (2016.01)
(Continued)

(52) U.S. Cl.
CPC ....... *H01M 8/1213* (2013.01); *H01M 4/8652* (2013.01); *H01M 4/8828* (2013.01);
(Continued)

(58) Field of Classification Search
None
See application file for complete search history.

(56) References Cited

U.S. PATENT DOCUMENTS

2002/0127455 A1 9/2002 Pham et al.
2003/0012994 A1 1/2003 Kushibiki et al.
(Continued)

FOREIGN PATENT DOCUMENTS

EP 0478185 4/1992
EP 1 261 059 A2 11/2002
(Continued)

OTHER PUBLICATIONS

Bruschi et al, "Technology of integrable free-standing yttria-stabilized zirconia membranes," Thin Solid Films, 346:251-251 (1999).
(Continued)

*Primary Examiner* — Barbara Gilliam
*Assistant Examiner* — Angela Martin
(74) *Attorney, Agent, or Firm* — Gerard Messina (57) ABSTRACT

An iterative process of depositing on a solid electrolyte a coating of unconnected particles composed of an ionically conductive material. A liquid solution is also applied. The liquid solution includes an inorganic component. The deposited liquid is heated to a temperature sufficient to evaporate or otherwise remove some or all of the volatile components of the liquid solution. Typically the temperature is below 1000° and often at about 850° C. The effect of heating the solution is to cause ion conducting material in the solution to adhere to the surface of the existing ion conducting particles and form connections between these particles. This is understood to create an ion conducting skeletal support structure. Within the intrestices of this skeletal support structure, the step of heating is also understood to result in the deposition of the inorganic component that will begin to form a electron conducting structure. The process of applying the liquid solution and heating may be repeated until a sufficiently thick layer of material is laid over the solid
(Continued)

electrolyte to provide the composite electrode structure desired.

36 Claims, 8 Drawing Sheets

(51) Int. Cl.
| | |
|---|---|
| H01M 8/1004 | (2016.01) |
| H01M 8/1097 | (2016.01) |
| H01M 8/1246 | (2016.01) |
| H01M 8/12 | (2016.01) |
| H01M 4/86 | (2006.01) |
| H01M 4/88 | (2006.01) |
| H01M 8/10 | (2016.01) |

(52) U.S. Cl.
CPC ....... *H01M 4/8885* (2013.01); *H01M 8/1286* (2013.01); *H01M 4/8657* (2013.01); *H01M 8/1004* (2013.01); *H01M 8/1097* (2013.01); *H01M 8/1246* (2013.01); *Y02E 60/521* (2013.01); *Y02E 60/525* (2013.01); *Y02P 70/56* (2015.11); *Y10T 428/25* (2015.01)

(56) References Cited

U.S. PATENT DOCUMENTS

2005/0072514 A1* 4/2005 Yan et al. ............... 156/230
2008/0299436 A1* 12/2008 Striker et al. ............ 429/33

FOREIGN PATENT DOCUMENTS

| EP | 1 359 635 A1 | 11/2003 | | |
|---|---|---|---|---|
| EP | 1 559 677 A2 | 8/2005 | | |
| JP | 04133264 | 5/1992 | | |
| WO | WO-00/20106 | 4/2000 | | |
| WO | WO 00/39358 | * | 7/2000 | ............ C23C 26/00 |
| WO | WO-0039358 | 7/2000 | | |
| WO | WO-02/43177 A2 | 5/2002 | | |
| WO | WO-2005/030376 | 4/2005 | | |

OTHER PUBLICATIONS

International Search Report dated Feb. 12, 2009 in International Application No. PCT/US2008/009293.

* cited by examiner

COMPOSITE ELECTRODE
AND CURRENT COLLECTOR STRUCTURE

CHEMICALLY SINTERED COMPOSITE ELECTRODES AND MANUFACTURING PROCESSES

TECHNICAL FIELD

The systems and methods, including manufacturing methods, described herein relate to solid oxide fuel cells (SOFC) using a solid electrolyte that may be formed as a thin semi-permeable membrane on a support substrate that has an electrode formed by a sintering process and adhered to the support substrate.

BACKGROUND

Fuel cells produce electricity from chemical reactions. The chemical reactions typically react hydrogen and air/oxygen as reactants, and produce water vapor as a primary by-product. The hydrogen can be provided directly, in the form of hydrogen gas, or can be derived from other fuels, such as butane or other hydrocarbon liquids or gasses, that can be reformed to isolate hydrogen gas for the reaction. A Solid Oxide Fuel Cell (SOFC) is often a solid state device which employs a solid oxide ceramic material such as Yttria Stabilized Zirconia (YSZ) as the electrolyte, which remains solid at normal operating temperatures—typically in the range of 800° C.—making it impermeable to gas transport. At these temperatures, the electrolyte is a good conductor of electrically charged oxygen ions, and the SOFC takes advantage of this property to generate and extract electrical current from the reaction between fuel and air via oxygen ion transport through the electrolyte.

Solid oxide fuel cell assemblies employ a pair of porous electrodes separated by a solid electrolyte member to extract energy from the fuel. The electrodes provide a large number of chemical reaction sites which enable electrically charged oxygen ions to be transported through the electrolyte, creating an electrical potential that can be harnessed by an external device. The electrodes employed by SOFCs have included electrodes formed from thermally sintered ion conducting particles. To form these sintered electrodes, a coating or layer of conductive particles may be laid over or applied to the solid oxide electrolyte and then the electrolyte and the particles can be heated, typically to a temperature above 1000° C. Optionally, this deposition and heating process can take place over several iterations, with the end result being a sintered layer of hard electrode material formed over and adhered to the electrolyte. Typically this process is used to form electrodes on both sides of the electrolyte, so that the process yields a layer of electrolyte that had electrodes on either side.

Although these processes for forming the sintered electrodes can work well, they do require a temperature that is sufficiently high to cause or to risk structural damage to the oxide electrolyte. The risk of damage increases with the fragility of the electrolyte layer. A problem today is that the electrolyte layer used in SOFCs seems to perform better if applied as a very thin layer of material over a substrate that acts as a mechanical support. The thin layer of electrolyte provides a greater efficiency per volume of material than a thicker layer. This can yield greater power densities for the fuel cell device. However, as layers grow thinner, the electrolyte becomes more susceptible to thermal damage, and thus—in an iterative process of thermal cycling that heats thin layers of electrolyte to relatively high temperatures—can fail as the thermal energy can warp or otherwise ruin the electrolyte layer.

Thus, there is a need in the art to provide improved methods for manufacturing SOFCs that have thin layer solid electrolytes, and to provide SOFCs having electrodes that are more reliably manufactured.

SUMMARY

The systems and methods described herein include, among other things, ionically and electrically conductive electrodes and methods for making the same. Although having many applications, it will be understood that the systems and methods described here are well suited for use by manufactures in production lines of thin film fuel cell devices, where the fuel cell has a thin substrate and/or electrolyte layer that is easily damaged by higher temperature thermal cycle electrode formation processes.

More particularly, the systems and methods described herein include methods for producing fuel cell electrodes. In one practice, the methods involve providing a substrate, applying a first layer to the substrate, wherein the first layer includes a plurality of unconnected particles and iteratively applying a second layer to the first layer, wherein the second layer is a liquid and includes an inorganic component, and heating the second layer to a temperature of less than about 1000 degrees Celsius. In this particular practice the layers are applied as separate materials being laid down in separate steps. However, in alternate practices, the two materials may be mixed together into a solution and that solution may be applied iteratively. In further optional practices the two materials may be mixed together in different relative amounts to apply mixtures of different concentrations, and these mixtures of different concentrations may be applied in separate steps to the substrate. In still other practices, the materials may be laid down as separate materials in some steps and as mixtures of materials in other steps. The actual process employed will vary according to the application at hand and the resulting material that is desired.

Continuing with the practice of laying the materials down separately, the method may include having the second layer also comprise a solvent, and wherein heating evaporates the solvent, thereby producing a solid coating on the first layer. The coating may comprise the inorganic component, and the inorganic component may be Platinum and/or Lanthanum Strontium Manganate. Other suitable materials may also be used.

During heating, the temperature of the substrate, when applying the second layer, is greater than about 50° C., and optionally heating may occur simultaneously with applying the second layer. The process of applying the second layer may comprise one of painting, screen printing, dip coating, spraying, dispensing from a needle, and jetting. Alternatively, the liquid may comprise a plating solution, and when applying the second layer the substrate may be suspended in a bath of the liquid. Other suitable techniques may also be employed.

Heating may comprise a first heating process and a second heating process, wherein the second heating is performed at a higher temperature than the first. The first heating may heat to a temperature of about 70° C. and the second heating comprises heating to a temperature of about 450° C.

The first material applied to the substrate may comprise an ionically conductive material, and optionally may be one of Yttria Stabilized Zirconia, Ceria, Hafnia, or some other material, or combinations of these materials that are suitable to the application. The second material may also comprise an ionically conductive inorganic component and a third applied material may include a liquid having an electronically conductive inorganic component.

In another aspect, the methods include a method for producing fuel cell electrodes that comprises providing a substrate, applying a first layer of material to the substrate, wherein the first layer comprises a plurality of unconnected particles, applying to the first layer a liquid having an inorganic component and a solvent, and heating the liquid to less than about 10000° degrees Celsius, thereby evaporating the solvent and producing a solid coating on the substrate, wherein the solid coating comprises the inorganic component.

In a further aspect, the invention provides a solid oxide fuel cell, comprising a solid oxide electrolyte, and at least one electrode deposited on the solid oxide electrolyte and having a plurality of connected particles, wherein at least about 80% of the plurality of particles have a diameter less than about 0.5 µm, and at least one electrode having a thickness being at least as thick as four of the particles.

Additionally, there are provided solid oxide fuel cells, comprising a solid oxide electrolyte, and at least one electrode deposited on the solid oxide electrolyte and having a plurality of connected particles, wherein at least 80% of the plurality of particles have a diameter less than about 0.5 µm, and at least one electrode having a thickness of at least 1 µm. Further, the devices provided include solid oxide fuel cells, having a solid oxide electrolyte, and at least one electrode comprising a skeleton having a first side and a second side, wherein the skeleton includes a plurality of pores, and wherein at least 90% of the plurality of pores have at least one opening on the first side and at least one opening on the second side.

In a further embodiment, the invention provides a fuel cell electrode comprising a substrate, a first layer applied or adhered to the substrate, wherein the first layer was applied as a plurality of unconnected particles, and a liquid comprising an inorganic component and a solvent, and at least one second layer was coupled to the first layer by evaporating the solvent and producing a solid coating of inorganic component on the first layer.

BRIEF DESCRIPTION OF THE DRAWINGS

These and other features and advantages will be more fully understood by the following illustrative description with reference to the appended drawings, in which like elements are labeled with like reference designations and which may not be drawn to scale.

DETAILED DESCRIPTION OF ILLUSTRATIVE EMBODIMENTS

The invention, in various embodiments, provides devices and methods that have porous and conductive electrodes for, among other things, portable fuel cell assemblies. Further disclosed are methods for manufacturing the same. More particularly, the systems and methods described herein include systems and methods for forming an ionically and electrically conductive electrode. The electrode may be formed as a layer of material disposed on to the surface of a solid electrolyte, and optionally on to the walls of a support structure attached to and supporting the electrolyte layer. In one embodiment, the electrode is formed as a conformal layer of a composite material that has properties of an electrode and a current collector. The conformal layer may coat at least one side of a thin layer solid oxide electrolyte and also coat the walls of a MEMS support structure that holds and supports that solid oxide electrolyte.

In one practice, the method of forming the electrode employs an iterative process of depositing on a solid electrolyte a coating of unconnected particles composed of an ionically conductive material. A liquid solution is also applied. The liquid solution includes an inorganic component. The deposited liquid is heated to a temperature sufficient to evaporate or otherwise remove some or all of the volatile components of the liquid solution. Typically the temperature is below 1000° and often at about 850° C. The effect of heating the solution is to cause ion conducting material in the solution to adhere to the surface of the existing ion conducting particles and form connections between these particles. This is understood to create an ion conducting skeletal support structure. Within the intestices of this skeletal support structure, the step of heating is also understood to result in the deposition of the inorganic component that will begin to form an electron conducting structure. The process of applying the liquid solution and heating may be repeated until a sufficiently thick layer of material is laid over the solid electrolyte to provide the composite electrode structure desired.

Figure 1:
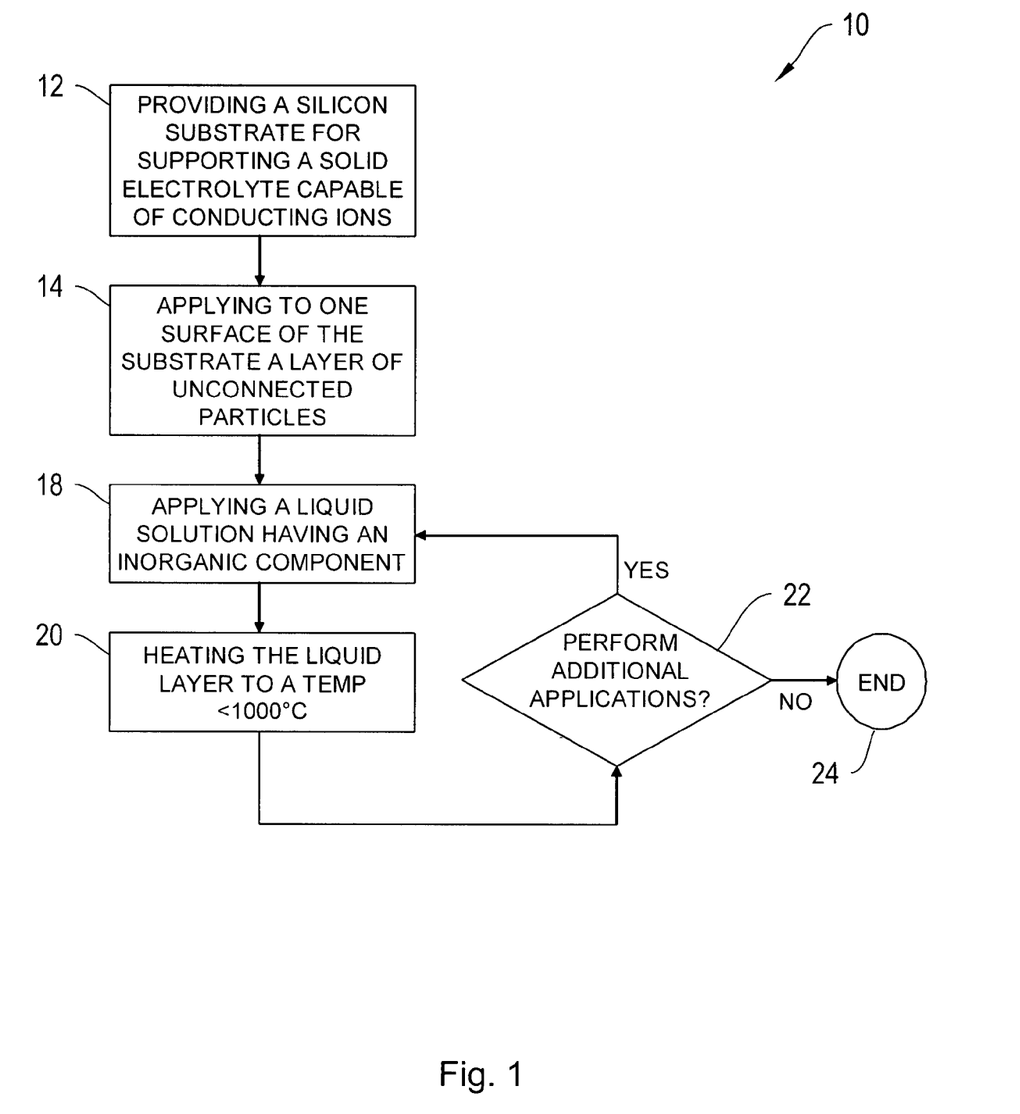
FIG. 1 depicts a flow chart diagram of one process according to the invention for manufacturing a fuel cell assembly.

More particularly, the systems and methods described herein include a process for forming an ionically and electrically conductive layer on a surface, such as the process 10 illustrated by the flow chart diagram presented in FIG. 1. The process 10 begins in step 12 when a silicon substrate layer is provided that supports a solid electrolyte layer. The electrolyte may be a thin, dense, 1 µm thick layer of Y-doped $ZrO_2$ (YSZ) electrolyte. The thin layer of electrolyte may be deposited on to a substrate, which is silicon, silicon nitride, a ceramic material or some other material or combination of materials useful for forming a support structure for the electrolyte layer.

Different support structures may be used and the structure selected will depend upon the application at hand. In the following illustrated embodiments, the support structure discussed is a silicon rich silicon nitride layer that is patterned into a matrix spaced islands. This is understood to provide a structure that will reduce the likelihood of the electrolyte cracking during formation or operation, as during such times the thermal cycling of the operations results in the different thermal expansion of the electrolyte layer and the support structure creating stress and strain on the fuel cell device. Such stress and strain may result in cracking that can interfere with the operation of the fuel cell. The use of a support structure that forms the electrolyte as a matrix of thin film membrane islands can help reduce the cracking that can occur within the electrolyte layer. A more detailed description of such a support structure is described in U.S. patent application publication US 2005/011589 A1, entitled, Stressed Thin-Film Membrane Islands. However, it shall be understood by one of skill in the art that such support structures are examples of the type of support structures that may be used with the processes and systems described herein and that described processes and systems are not limited to a support structure comprising a plurality of spaced islands and may in fact work with other support structures including relatively large silicon rich silicon nitride substrates, substrates formed from plastic materials then ceramics, substrates formed into cylinders and other geometries, without department from the scope of the invention.

Figure 3:
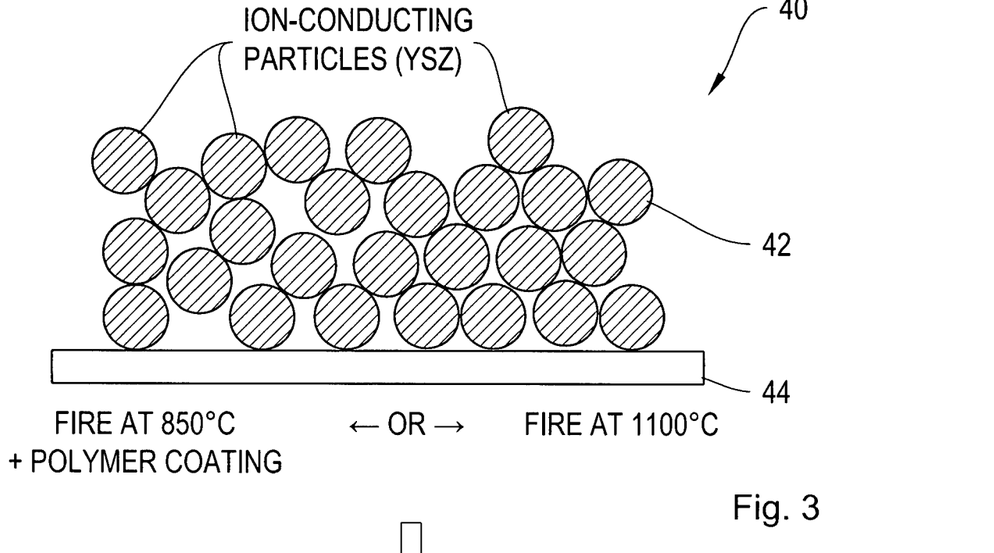
FIG. 3 depicts a collection of ion conducting particles deposited on a substrate.

Turning back to FIG. 1, the process 10 proceeds to step 14 where, in steps 14 through 24 the process performs an iterative coating process that chemically sinters an electrode layer onto the support structure. More particularly in step 14 the process 10 applies to one surface of the substrate a layer of unconnected particles. Typically in step 14, the particles applied are particles made of an ionically conductive material such as Yttria stabilized Zirconia, Ceria or Hafnia. As shown in FIG. 3, the applied ion conducting particles lay almost as particles of sand on top of the substrate surface. Although touching, the particles are unconnected and therefore have some ability to move relative to each other. Once applied, the process 10 proceeds to step 18 wherein a liquid solution having an inorganic component is applied to the particles that were earlier laid upon the support substrate. The inorganic component may be Platinum, Lanthanum Strontium Manganate, or some other suitable inorganic component. An example of a suitable liquid would be hexachloroplatinic acid, possibly diluted with a standard solvent such as butoxyethanol to modify the viscosity and wetting behavior. With the liquid applied, the ion conducting particles are now covered or substantially covered by the liquid which coats the particles and fills interstecies.

After the liquid is applied in step 18, the process proceeds to step 20 where the liquid layer is heated to a temperature below 1,000 degrees Celsius and typically about 850° C. This allows the components of the liquid layer that are volatile below 1,000 degrees Celsius to evaporate leaving behind the non-volatile materials to act as a coating that remains upon the ion conducting particles. This begins to form the ion conducting skeleton that arises from connecting the previously unjoined ion conducting particles. Additionally, the inorganic component in the liquid solution can be left behind to provide electrically conductive particles that in subsequent iterations will provide an electrically conductive skeletal structure within the electrolyte layer. Thus FIG. 1 shows the additional step 22 wherein the process 10 determines whether to perform additional applications of the liquid solution having the inorganic compound and the heating step laid out in step 20. The process continues until the electrolyte layer appropriate for the application is developed and deposited onto the support substrate. Once the electrolyte layer is complete the process 10 moves to step 24 and terminates.

The temperature selected for use during the heating step 20 may be set below the temperature at which damage will occur to a solid oxide electrolyte and on a silicon based substrate. As such, the process depicted in FIG. 1 is well suited for use with MEMS devices and thin layer solid oxide electrolytes both of which are susceptible to damage at temperatures commonly used during thermal sintering processes used to form electrodes. Thus in one aspect, the systems and methods described herein allow thin layer devices, such as thin layer electrolytes and thin layer MEMs devices and structures, to be used with composite electrodes that are formed on such devices by deposition processes.

Figure 2:
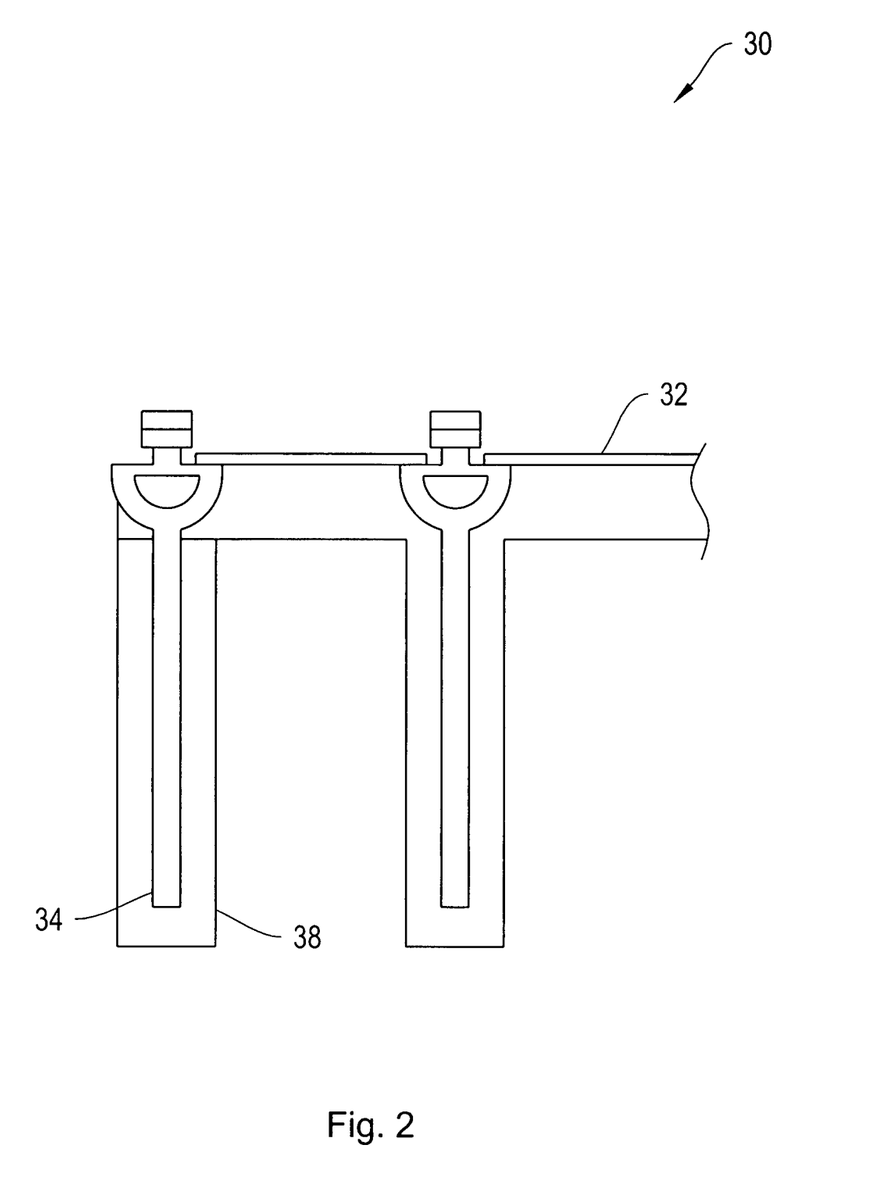
FIG. 2 presents a cross-sectional view of a planar fuel cell according to one embodiment of the invention.

Returning to FIG. 2, a cross-sectional view of one embodiment on the invention is depicted. In particular, FIG. 2 depicts a partial cross-sectional view of a fuel cell 30 that has an electrolyte layer 32 sitting on top of and adhered to a silicon nitride support structure 34. An electrode film 38 coats the silicon nitride support structure and is placed in electrical contact and physical contact with the electrolyte layers 32 as shown in FIG. 2. In the embodiment depicted in FIG. 2, the electrode film 38 has been formed according to the process 10 described with reference to FIG. 1. The electrode film 38 is a chemically sintered film that provides ion and electrical conduction. As shown in FIG. 2, both sides of the fuel cell electrolyte are covered by the electrode film 38. The electrode film 38 would be a permeable anode or permeable cathode depending upon the operation of the fuel cell. As air flows along the cathode, oxygen molecules are brought in contact with the cathode/electrolyte interface and catalytically acquire four electrons from the cathode as it splits into two oxygen ions. The oxygen ions diffuse into the electrolyte layer 32 and migrate to the other side of the fuel cell where they would encounter an anode. The oxygen ions encounter the fuel at the anode/electrolyte interface and react catalytically, giving off water, carbon dioxide, heat and electrons. The electrode film 38 allows the electrons to be transported through the anode to an external device and back to the cathode, providing a source of useful electrical energy. Thus the electrode film 38 depicted in FIG. 2 is sufficiently porous to allow, at least under certain gas pressure conditions, for the transport, at least under certain gas pressure conditions, of an oxygen molecule to the cathode/electrolyte interface that exists between the electrolyte layer 32 and the electrode film 38.

FIGS. 3 through 6 depict pictorially one process according to the invention for chemically sintering the electrode film 38 onto the silicon nitride support structure 34 and the electrolyte layer 32 shown in FIG. 2. In the process discussed, the support substrate will be a silicon-rich silicon nitride support substrate. Although there may be SiO within the support structure, it is common to control the amount of SiO that may form under the electrode as SiO is an insulator and interferes with electrical flow. As shown in FIG. 2, the support substrate may be a MEMS structure having dimensions of a typical MEMS device such as the dimensions given with reference to FIGS. 7B and 7C. However, the process described and shown in FIGS. 3 through 6 is not so limited and may be employed when forming electrode structures over electrolyte layers and support structures used with large-scale fuel cells or other devices Turning to FIG. 3, there is depicted a plurality 40 of ion-conducting particles 42 that are deposited on the surface 44 of the silicon nitride support surface such as the silicon nitride wall 34 depicted in FIG. 2. The ion-conducting particles 42 shown in FIG. 3 would also be deposited on top of the electrolyte layer 32 shown in FIG. 2. The depiction of the particles 42 being deposited between the silicon nitride walls and on top of the electrolyte layer is shown pictorially on FIG. 8B.

Once deposited, a polymer coating (not shown) may be applied and the materials may be heated to a temperature below 1000 degrees Celsius, and typically around 850 degrees Celsius.

Figure 4:
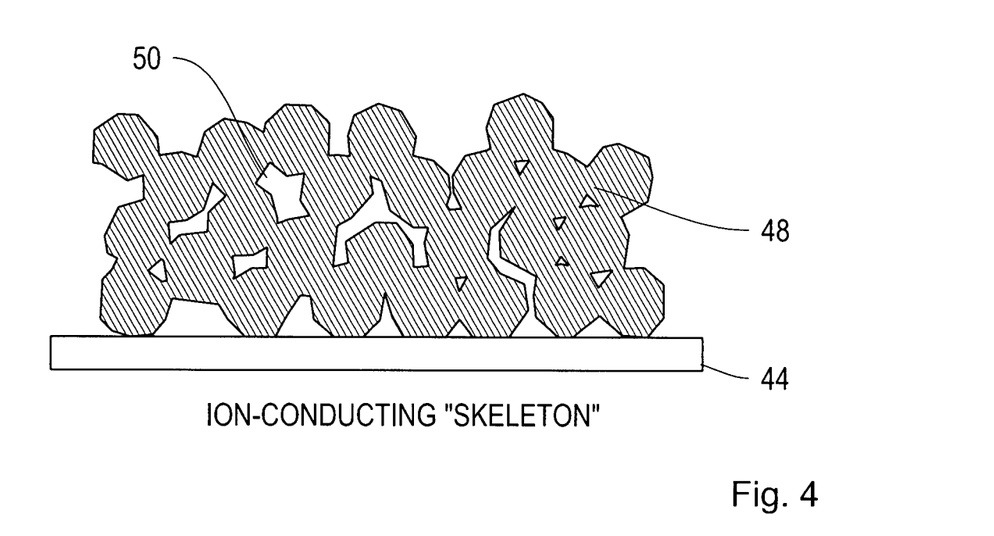
FIG. 4 depicts the ion conducting particles of FIG. 3 after a sintering process.

After the heating, or firing, process, the ion-conducting particles 42 begin to join into an ion-conducting skeleton 48 such as that depicted in FIG. 4. As shown in FIG. 4, the ion-conducting particles are now in contact with each other thus provide pathways for ions that will extend from one side of the electrode to the other side. Interstices 50 also form within the ion conducting skeleton 48.

Figure 5:
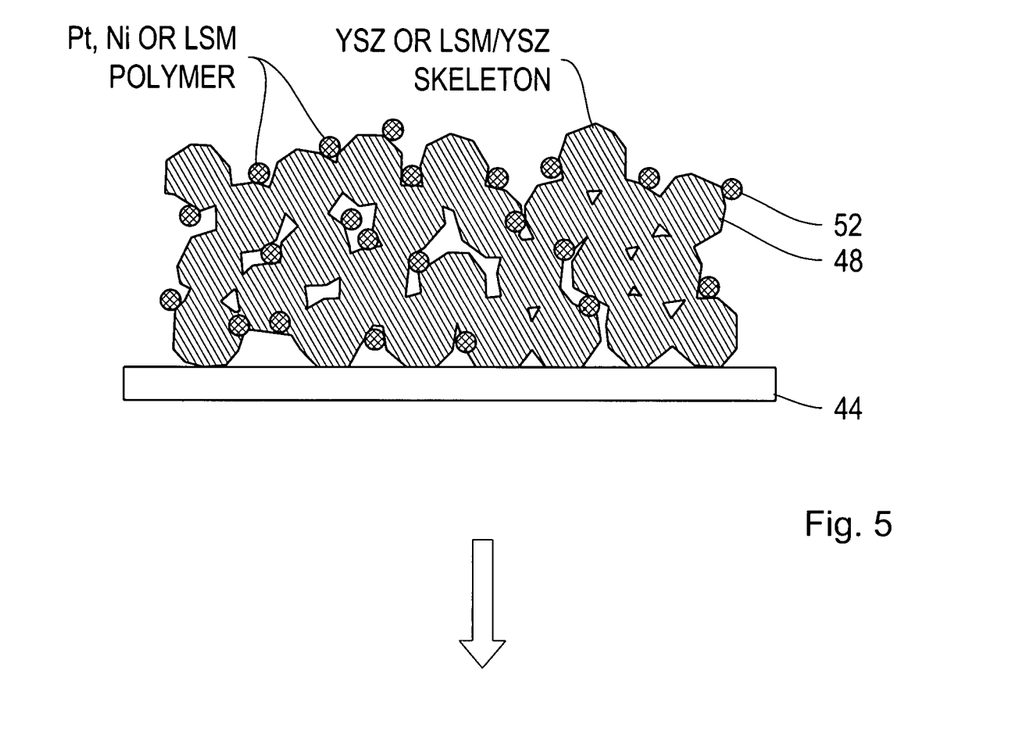
FIG. 5 depicts the deposition of polymeric material on the sintered particles shown in FIG. 4.
Figure 6:
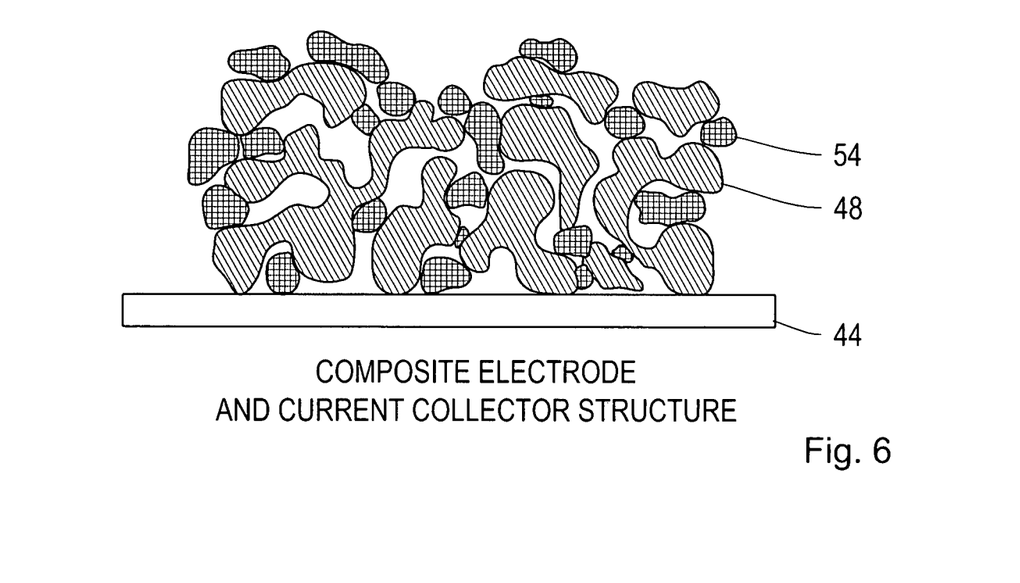
FIG. 6 depicts the composite electrode and current collector structure.

Turning to FIG. 5, the application of a compound having an inorganic component 52 such as Platinum or Nickel is shown. The inorganic compound can fall within the interstices SiO of the ion-conducting skeleton 48 depicted in FIG. 4. As the applied compound is heated, the inorganic component can form into a matrix of electron-conducting pathways formed within the ion-conducting electrode structure. This provides a composite electrode and current collector structure formed on the silicon nitride walls 34 and the electrolyte layer 32. The process in FIGS. 3 through 6 can be repeated until a layer of sufficient thickness is developed. It will be noted that the other factors may be considered when determining the volume of materials to apply, the temperature to use during each round of the heating step 20, and the number of interations to perform. For example, measures of the power needed to be carried and resistance measures may be monitored, the porosity of the layer and its ability to conduct ions may be considered. Similarly physical characteristics such as dimensions of the needed electrode and mechanical strength may also be considered.

Figure 7A:
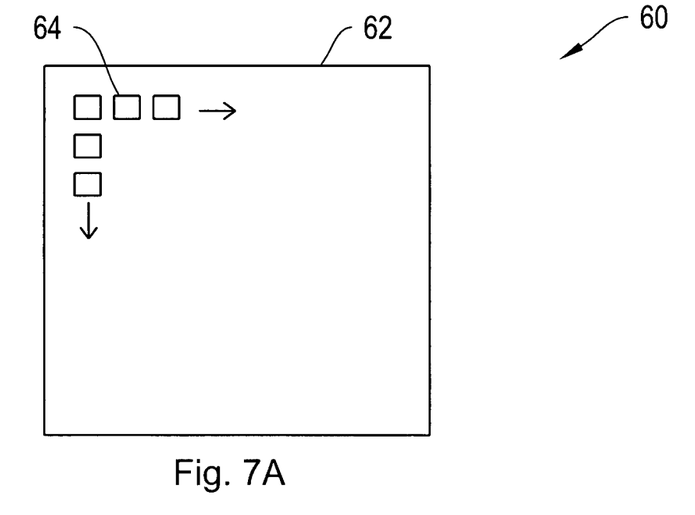
FIG. 7A depicts a fuel cell support substrate having a plurality of membrane "wells" formed on the substrate and spaced apart from each other.
Figure 7B:
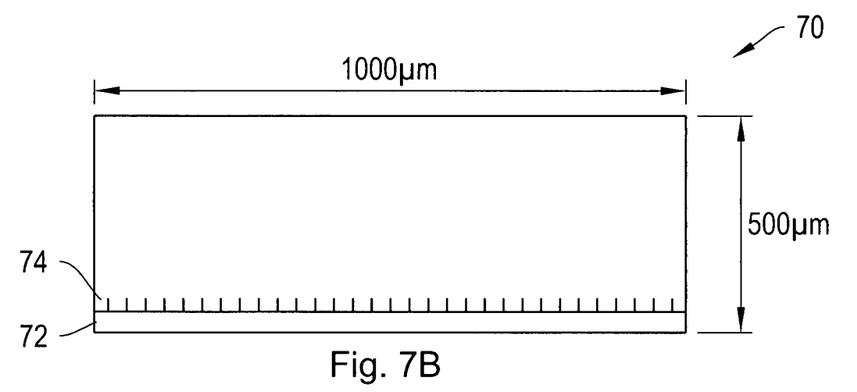
FIG. 7B depicts a cross sectional side view of a single membrane well within the substrate depicted in FIG. 7A.
Figure 7C:
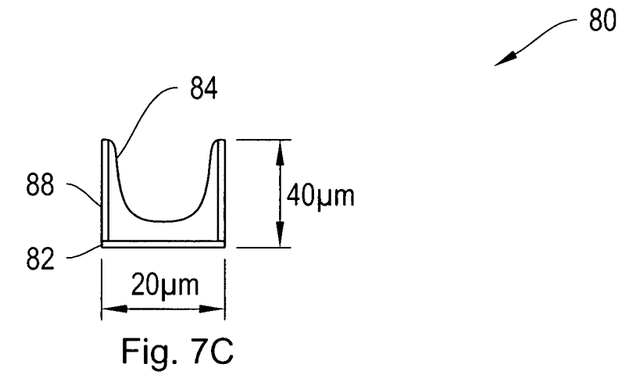
FIG. 7C depicts in more detail one fuel cell membrane with an electrode formed thereon according to the process depicted in FIG. 1.
Figure 8A:
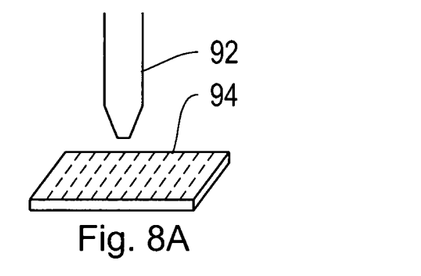
FIGS. 8A-H depict graphically one process according to the invention for forming an electrode on a substrate surface.
Figure 8B:
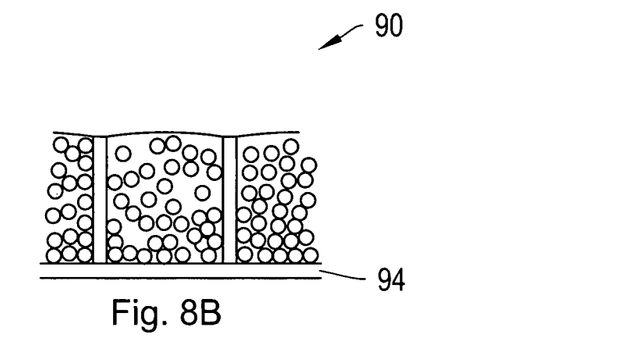
Figure 8C:
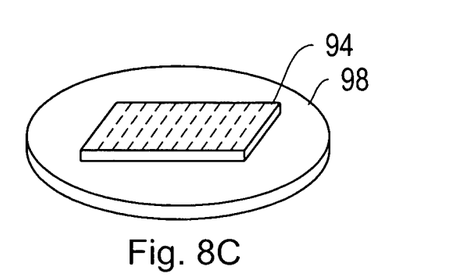
Figure 8D:
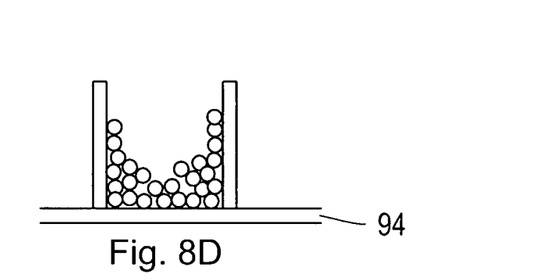
Figure 8E:
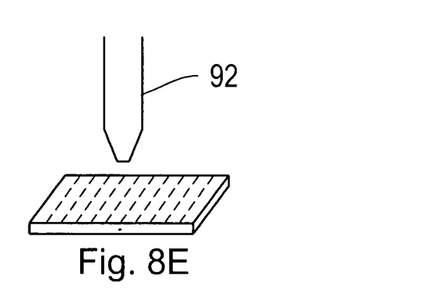
Figure 8F:
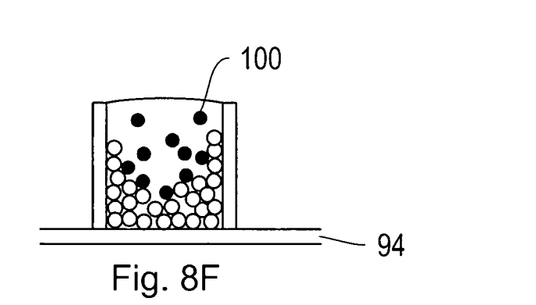
Figure 8G:
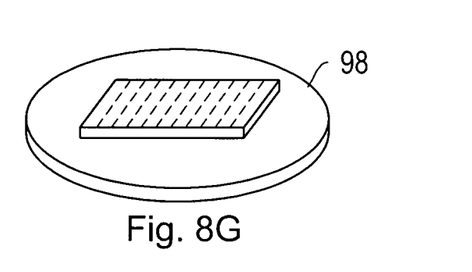
Figure 8H:
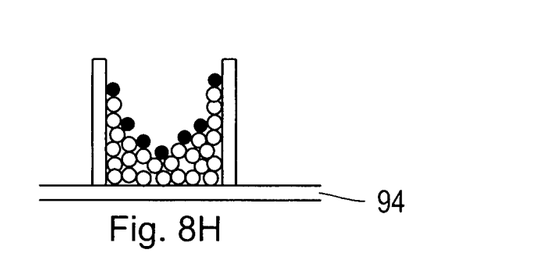

Turning to FIGS. 7A through 7C, one particular embodiment of the fuel cell structure as described herein is shown in more detail. In particular, FIG. 7A depicts a fuel cell chip 60 that comprises a silicon nitride substrate 62 that has formed thereon a plurality of thin-film membranes 64. As shown in FIG. 7A, these membranes 64 are arranged as a matrix of separate wells, each of which is physically spaced from its nearest neighbors. As described above, this geometry in structure is understood to reduce the likelihood of cracking occurring in the electrolyte structure due to thermal cycling issues that can arise during the operation of the fuel cell. FIG. 7B depicts a cross-sectional side view of a single membrane 64 depicted in FIG. 7A. In particular, FIG. 7B shows a side view 70 that shows the MEMS membrane layer 72 and shows a plurality of silicon nitride walls extending upwardly from the thin film electrolyte. The silicon nitride walls may be placed at either end of each individual thin-film membrane island and this results in the depicted array of evenly-spaced silicon nitride walls formed on the substrate 72. The walls may be thin posts or may be thin walls that extend around a portion of the periphery of each thin film membrane island Examples of thin film membrane islands are set out in U.S. patent application, U.S. Ser. No. 10/948,084, Publication No. 20050115889, the contents of which are incorporated by reference in the entirety. This publication discloses devices that have membranes that are spaced apart from each other and have a size that reduces the likelihood of cracking. The techniques described herein may be employed to form films on the structures shown in this incorporated publication. However, this incorporated publication shows only one example of the type of films and membranes that may be formed, at lest in part, with the systems and methods described herein, and other membranes of different sizes, geometries, topologies and compositions may be formed with the systems and methods described herein, without departing from the scope of the invention. FIG. 7B also shows that for this embodiment the fuel cell structure is approximately 1,000 microns in width and the membrane layer 72 along with the silicon nitride wall 74 are approximately 20 microns to 50 microns in height. Dimensions are shown further by FIG. 7C which shows in more detail a cross-section of a single electrode structure 80 that includes the electrolyte layer 82, the silicon nitride wall 88 and the chemically-sintered electrode 84. As shown in FIG. 7C, the electrode layer 84 forms a substantially conformal layer that coats the silicon nitride walls 88 and the electrolyte 82. The dimensions are given as approximately 20 microns in width and 40 microns in height.

FIG. 8 depicts a manufacturing process for manufacturing the composite electrode described above. In particular FIG. 8A depicts a thin film membrane 94 such as the thin film membranes described above that include a matrix of islands each spaced apart from each other. Above the electrolyte 94 is a liquid dispensing nozzle 92 that, although not shown, may operate under the control of a robotic system or be manually operated or otherwise control the purpose of dispensing a fluid containing the ion conducting particles described above onto the thin film membrane substrate 94. FIG. 8B shows in cross section and in more detail the thin film membrane 94 after the liquid containing the ion conducting particles has been deposited on to that surface. As shown in FIG. 8B a plurality of ion conducting particles will sit above the electrolyte layer on the substrate 94 and between the silicon nitride walls and will remain in a liquid suspension. In FIG. 8C the thin film membrane substrate 94 is placed on a heating element 98 and raises the temperature of the liquid suspension to a point sufficiently high to cause volatile components in the liquid suspension to evaporate. The results as depicted in FIG. 8D where the ion conducting particles are left on top of the electrolyte layer and between the silicon nitride walls. As discussed above the ion conducting particles are unconnected at this point and lie like grains of sand piled on top of each other. In FIG. 8E the liquid dispensing nozzle 92 is then employed for the purpose of disposing the liquid solution that contains the inorganic compound 100. As shown in FIG. 8F, hexachloroplatinic acid (for example) solution sits above the electrolyte and between the walls of the silicon nitride on this structure with the organic component being disbursed throughout the liquid solution. FIG. 8G depicts that the substrate 94 having the liquid solution containing the inorganic compound is placed on the heating element 98 so that the liquid solution may be raised to a temperature such as 850° C. that is sufficiently high to cause the volatile components to evaporate leaving behind the inorganic compound which is an electron conductor. As discussed above, this process may be continued until a composite electrode structure of sufficient thickness and characteristic is developed.

Figure 9A:
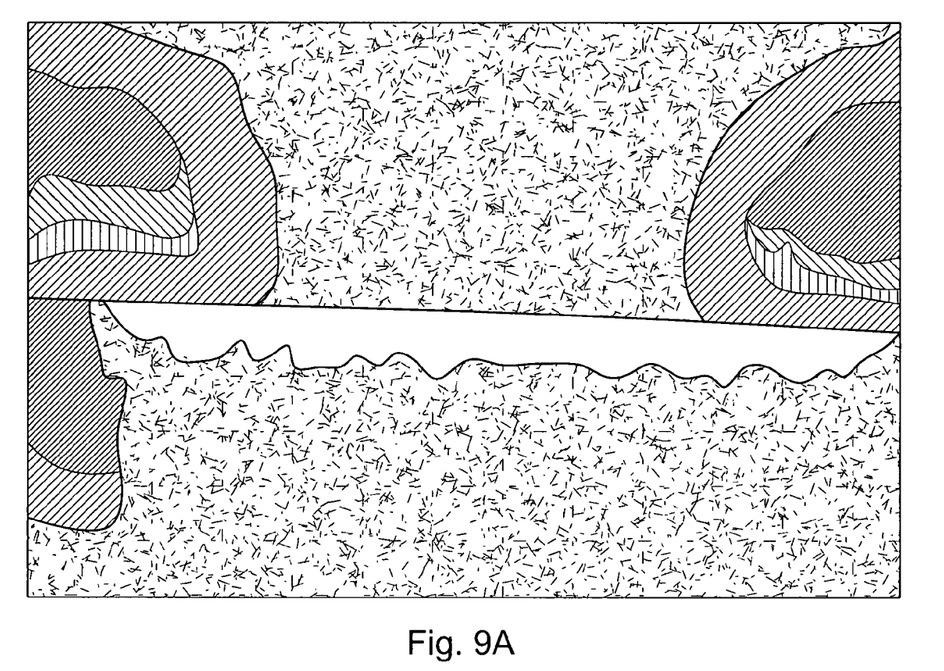
FIG. 9A-9D show an SEM of an electrode according to the invention, and a pictorial representation of a particle coating process.
Figure 9B:
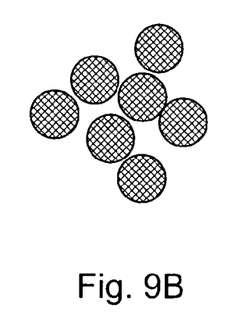
Figure 9C:
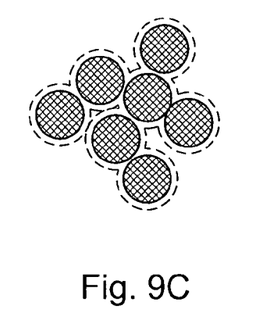
Figure 9D:
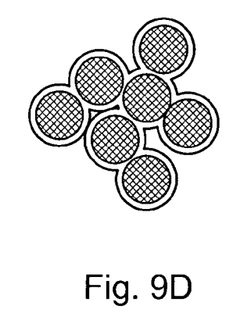
Figure 10:
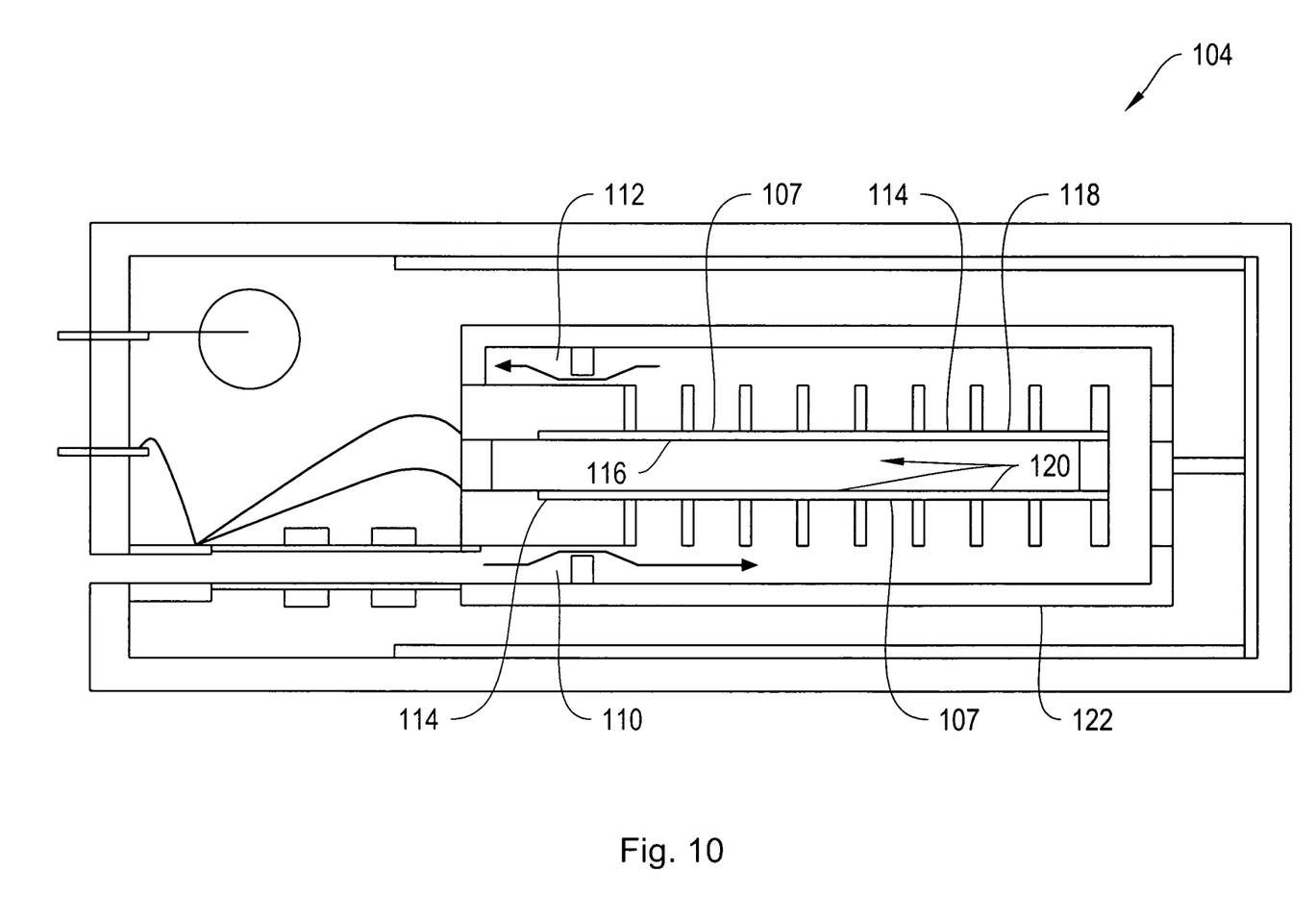
FIG. 10 depicts one example of a fuel cell having the composite electrode formed using the process described in FIG. 1.

FIG. 9A depicts a scanning electron micrograph cross-sectional view of a composite electrode structure formed on top of an electrolyte layer having silicon nitride MEMS support structure walls attached thereto. FIGS. 9B through 9D illustrate that successive liquid layers build up conformal coating over initial particle-based skeleton. FIG. 9B shows the loosely packed particles from first layer, and FIG. 9C shows the particles after one (1) coating. FIG. 9D depicts the particles after two (2) coatings, and one can see the depicted neck growth between particles, bonding them together, both structurally and electrically. FIG. 10 shows a fuel cell assembly 104 having a composite electrode structure according to an illustrative embodiment of the invention. In particular, the fuel cell assembly 104 includes a plurality of fuel cell units 107. Each of the fuel cell units 107 includes an anode 114 and a cathode 116 disposed on either an electrolyte/membrane layer 118 or an electrolyte membrane layer 120. The fuel cell units 107 electrically connect in series via electrical and the assembly further includes a fuel reformer 110 and a tail gas burner 112 contained within a housing 122. The fuel cell assembly 104 may also include a fuel canister (not shown).

The fuel cell units 107 produce electricity when hydrogen contacts the anodes 114 and oxygen contacts the cathodes 116. The anode 114 is a composite chemically sintered conformal layer of material that adheres to the surface of the electrolyte and the support walls. This conformal layer of material is porous, and allows fuel to pass at certain pressures. Operating pressures may be near atmospheric, and optionally a couple of psi above to drive the flow throw the device. Catalyst (e.g., a platinum based catalyst) is optionally disposed at the interfaces of the anodes 114 and the electrolyte layers and/or at the interfaces of the cathodes 6 and the electrolyte layers. The hydrogen and oxygen electrochemically react with the anodes, the cathodes, the electrolyte membranes, and catalysts (not shown) to produce voltage differentials between respective anodes and cathodes. The respective voltage differentials created by the fuel cells combine through the series connection of fuel cells, and can be used to drive electrical current and power a load (not shown).

In operation, a fuel stream enters through the fuel inlet. The fuel stream can include liquid or gas, and can comprise hydrogen or a hydrocarbon based fuel such as methane, ethane, methanol, butane, pentane, methanol, formic acid, ethanol, and/or propane. In addition or in the alternative, the fuel stream can comprise a non-hydrocarbon based fuel such as ammonia or hydrazine. The fuel stream passes through a reformer region 10 and chemically reacts with catalysts in the reformer region to produce hydrogen and/or carbon monoxide from the fuel stream, although if the fuel stream comprises pure hydrogen gas the reformer region 10 is not necessary. The reformer region can comprise one or more of a steam reformer, a partial oxidation reformer, a preferential oxidation reformer, an aqueous shift reformer, and/or a thermal cracking reformer. The actual reformer used will depend upon the Application, and any suitable reformer may be employed.

The anodes can be constructed of a wide variety of materials, including cement composites such as nickel and YSZ cermets, platinum, silver, palladium, ruthenium, iron, cobalt, ceria, other oxide matrix materials, or combinations thereof. The cathodes can be constructed from lanthanum (strontium) manganate (LSM), lanthanaum (strontium) cobaltite (LSC), and lanthanum (strontium) cobalt-ferrite (LSCF). The electrolyte layers can comprise yttria-stabilized zirconia (YSZ) and/or doped ceria materials.

Processing variations including thermal drying and curing cycles with maximum temperatures in the range of 200° C., 300° C., 400° C., or 500° C. depending on solvent system. Drying may be performed in air, or controlled ratios of oxygen and nitrogen (oxidizing) or hydrogen and nitrogen (reducing) environments, other controlled ambient with inert and/or reactive gasses, and at various pressures including elevated pressures greater than 2 atmospheres, near atmospheric pressure, and less than 0.1 atmospheres. Starting particle mixes may contain combinations of YSZ powder of average particle size less than 100 nm to 500 nm, YSZ-Platinum particle mixes, or other mixes of electronic and ionic conductors. Similarly, the liquid coating applied in stage two may contain liquid mixes of these same materials in the same or different ratios to produce a desire final volume fraction of components. Different solvent systems have been used with this method to taylor the drying and coating behavior of both the particle and liquid coatings, including ethylene glycol, isopropyl alcohol, butoxyethanol, water, toluene, terpineol, Texanol (Eastman Chemical Company, Kingsport, Tenn.), and other polar and non-polar solvents. Coating properties can be tailored by adjusting the substrate temperature during application of the liquid, including near room temperature, 30-50 degrees Celsius, 50-100 degrees Celsius, or 100-200 degrees Celsius. Electrode structure can be modified by alternating particle and liquid coats to chemically sinter the structure in successive stages. The number of coatings to achieve a desired affect, such as electrode conductivity above a certain target level, may require a few coats to tens of coats, depending on the concentration of inorganic component in the liquid solution and the choice of solvent. Example numbers of coats include 5, 5-10, 20-100, or greater than 100 coats. Electrodes have been produced with this technique that are as thin as 1 um to as thick as 40 um, with a typical target thickness in the range of 5 um to 20 um. Other materials, configurations, and fabrication methods for the electrolyte layers and are described in PCT application WO 2005/030376, incorporated herein by reference in its entirety.

The configurations, devices, and methods described above can be used in any operative combination with other configurations, devices, and methods known in the art, including those described in U.S. Patent and Application Nos. 2005/0069737; 2005/0132648; 6,939,632; 2004/0241061; 2004/0072039; 2005/0249993; 6,680,139; 2004/0028975; 6,852,436; 6,623,881; 2003/0096147; 2005/0221131; 5,925,477; 5,190,834; 5,479,178; 6,183,897; and 5,595,833, all of which are incorporated herein by reference in their entireties.

The fuel cell assemblies discussed above may be any type of fuel cell known in the art, such as solid-oxide fuel cells and/or proton exchange membrane fuel cells (PEM). They may be provided in a housing which integrates one or more of the functions of a fuel reformer, a set of fuel cell membranes, a tail gas burner, and all internal fluid manifolds in one thermal zone, can be fabricated through any number of fabrication techniques. In particular, embodiments of the invention can be fabricated using MEMS techniques (micro-electro-mechanical systems) or micromachining techniques. Such techniques make it possible to integrate thin film materials (for instance thin film electrolytes, anodes, cathodes and/or electrical connections) along with etched microchannels for control of fluid flow onto a common substrate that is thermally conductive and mechanically robust.

For example, an integrated housing can be assembled from a group of substantially planar or non-planar semiconductor structures. Specifically, five silicon substrates can be bonded together to form the "box" that various fuel cell apparatus components are integrated within. Bonding together the five silicon substrates, results in a stacked configuration. In one embodiment, the substrates can be stacked as follows: (1) fuel reformer substrate including fluidic interconnects; (2) a membrane electrode assembly, (3) a fluid routing layer, (4) another membrane electrode assembly, and (5) a top fluid routing layer including tail gas burner. Thus, a stack of layers can form some or all of the integrated fuel cell apparatus.

In a preferred embodiment, silicon is chosen as the substrate for building the fuel cell membranes and other manifold structures. However, micromachining techniques also exist for building fluid flow channels in rigid wafers of glass and ceramic, all materials which possess the high temperature strength required for solid oxide fuel cells. In order to prevent electrical shorting between different points of the membrane assembly, a silicon substrate can be coated with layers of silicon oxide or silicon nitride to render it electrically insulating.

Etched fluidic microchannels are formed in the above substrates by a variety of techniques, including wet and dry chemical etching, laser ablation, diamond milling, tape casting, or injection molding. A variety of substrate or wafer bonding techniques are available including fusion bonding, anodic bonding, sealing by means of eutectic solder materials or thin films, or sealing by means of glass frits.

Fuel cell assemblies, including the anode, cathode, and electrolyte can be deposited by a variety of thin and thick film deposition techniques including sputtering, evaporation, chemical vapor deposition, laser ablation, screen-printing, dip coating, or vapor spray techniques.

While this invention has been particularly shown and described with references to preferred embodiments thereof, it will be understood by those skilled in the art that various changes in form and details may be made therein without departing from the scope of the invention encompassed by the appended claims. For example, the two sides of the substrate may not have the same compositions or topologies. Alternatively, one side of the substrate may have multiple electrode types applied to it, and the coating of multiple chambers, such as those that occur in the above described hexagonal structure, may be distinct from a single, uniform electrode sheet. Still other variations, practices and modifications may be made without departing from the scope of the invention.

What is claimed is:

1. A method for producing solid oxide fuel cell (SOFC) electrodes on a substrate, the method comprising:
   providing the substrate, the substrate including a solid oxide electrolyte or a support structure attached to and supporting the solid oxide electrolyte;
   in a first layer step, applying a first layer of individual, unconnected particles to the substrate, wherein the first layer includes a plurality of individual particles composed of oxygen ionically conductive material;
   in a second layer step, separate from the first layer step, applying liquid to the first layer, wherein the liquid includes an ionically conductive inorganic component, an electrically conductive inorganic component, and a solvent so that the ionically conductive inorganic component and the electrically conductive inorganic component substantially cover at least a portion of each particle on the substrate, wherein the another layer step applies a different material composition than the first layer step; and
   in a third layer step, heating the liquid to a temperature of less than about 1000 degrees Celsius, so as to evaporate the solvent and produce a coating on the particles to form an ionically and electrically conductive layer;
   wherein the first layer includes a plurality of the individual, unconnected particles.

2. The method of claim 1, wherein the inorganic component includes one of Platinum and Lanthanum Strontium Manganate.

3. The method of claim 1, wherein the substrate has a substrate temperature, and when applying the liquid, the substrate temperature is greater than about 50° C.

4. The method of claim 1, wherein heating occurs simultaneous with applying the liquid.

5. The method of claim 1, wherein applying liquid comprises one of painting, screen printing, dip coating, spraying, dispensing from a needle, and jetting.

6. The method of claim 1, wherein the liquid further comprises a plating solution, and applying the liquid comprises suspending the substrate in a bath of the liquid.

7. The method of claim 1, wherein the heating includes a first heating and a second heating, and the second heating is hotter than the first heating.

8. The method of claim 7, wherein the first heating comprises heating to a temperature of about 70° C. and the second heating comprises heating to a temperature of about 450° C.

9. The method of claim 1, wherein the inorganic component has a weight and the liquid has a total weight including the weight of the inorganic component, and wherein the weight of the inorganic component is less than ten percent of the total weight of the liquid.

10. The method of claim 1, wherein the first layer has a weight, and the inorganic component has a weight, and wherein the weight of the inorganic component is less than ten percent of the weight of the first layer.

11. The method of claim 1, wherein the first layer further comprises pores located between the individual particles, and wherein applying the liquid comprises substantially filling the pores with the liquid.

12. The method of claim 1, wherein the oxygen ion conductive material comprises one of Yttria Stabilized Zirconia, Ceria, or Hafnia.

13. The method of claim 1, wherein the ionically conductive inorganic component is applied in a second layer and the electronically conductive inorganic component is applied in another layer.

14. The method of claim 13, further comprising:
   heating the second layer to less than about 1000 degrees Celsius.

15. The method of claim 1, wherein the individual particles of the oxygen ionically conductive material are ionically conductive.

16. The method of claim 1, wherein the individual particles of the electrically conductive inorganic component are electrically conductive.

17. The method of claim 1, wherein the first layer further includes a plurality of individual particles comprising electronically conductive particles.

18. The method of claim 1, further comprising:
   applying a second layer to the substrate, wherein the second layer comprises a plurality of individual particles.

19. The method of claim 18, wherein the first layer is applied to a first portion of the substrate and the second layer is applied to a second portion of the substrate.

20. The method of claim 1, wherein the liquid is selectively applied to a portion of the substrate.

21. The method of claim 1, further comprising providing at least one wall coupled to the substrate to provide at least two separate portions of the substrate.

22. The method of claim 1, further comprising:
   providing a mask to form distinct electrodes on the substrate.

23. The method of claim 1, wherein the temperature is less than about 850° C.

24. The method of claim 1, wherein the temperature is less than about 500° C.

25. The method of claim 1, wherein the support structure includes a silicon nitride layer patterned into matrix spaced islands.

26. The method of claim 25, wherein the electrically conductive inorganic component is provided in the form of a liquid solution that includes hexachloroplatinic acid.

27. The method of claim 25, wherein the electrically conductive inorganic component is provided in the form of a liquid solution that includes hexachloroplatinic acid, diluted with a solvent.

28. The method of claim 25, wherein the electrically conductive inorganic component is provided in the form of a liquid solution that includes hexachloroplatinic acid, diluted with a solvent, which includes butoxyethanol.

29. The method of claim 1, wherein the electrically conductive inorganic component is provided in the form of a liquid solution that includes hexachloroplatinic acid.

30. The method of claim 1, wherein the electrically conductive inorganic component is provided in the form of a liquid solution that includes hexachloroplatinic acid, diluted with a solvent.

31. The method of claim 1, wherein the electrically conductive inorganic component is provided in the form of a liquid solution that includes hexachloroplatinic acid, diluted with a solvent, which includes butoxyethanol.

32. The method of claim 1, wherein the liquid includes the electrically conductive inorganic component and a solvent so that the electrically conductive inorganic component substantially cover at least a portion of each particle on the substrate, wherein the another layer step applies a different material composition than the first layer step, and wherein the liquid is heated to a temperature of less than about 1000 degrees Celsius, so as to evaporate the solvent and produce the coating on the ionically conducting particles, so that the electrically conductive inorganic material forms into a matrix of electron conducting pathways formed within the ion-conducting structure, so as to form the ionically and electrically conductive layer.

33. The method of claim 1, wherein the unconnected particles have the ability to move relative to each other so as to form a skeleton, and wherein in the second layer step and the third layer step, the skeleton is transformed into a compact layer.

34. The method of claim 33, wherein transformation is done by applying a liquid with other material in it and evaporating a solvent of the liquid by heating so as to result in a chemically sintered layer of the first material and the second material.

35. The method of claim 33, wherein the first layer of unconnected particles is dry.

36. The method of claim 1, wherein the first layer of unconnected particles is dry.

* * * * *